United States Patent

Kurr et al.

[11] Patent Number: 5,232,477
[45] Date of Patent: Aug. 3, 1993

[54] DEVICE FOR CONTROLLING EXHAUST EMISSION

[75] Inventors: Klaus Kurr, Weinheim; Karl-Heinrich Spies, Birkenau; Reinhard Latsch, Sinsheim, all of Fed. Rep. of Germany

[73] Assignee: Firma Carl Freudenberg, Weinheim/Bergstr., Fed. Rep. of Germany

[21] Appl. No.: 988,508

[22] Filed: Dec. 10, 1992

[30] Foreign Application Priority Data

Dec. 10, 1991 [DE] Fed. Rep. of Germany ....... 4140612

[51] Int. Cl.⁵ .............................................. B01D 46/18
[52] U.S. Cl. .......................................... 55/97; 55/213; 55/249; 55/290; 55/352; 55/528; 55/DIG. 30; 60/303; 60/311
[58] Field of Search ................. 55/96, 97, 213, 269, 55/282, 295, 351, 352, 523, 528, DIG. 30, 283, 290; 60/303, 311

[56] References Cited

U.S. PATENT DOCUMENTS

| 3,019,855 | 2/1962 | Engle | 55/352 |
| 3,375,638 | 4/1968 | Dungler | 55/290 X |
| 4,230,465 | 10/1980 | Hope | 55/290 X |
| 4,874,407 | 10/1989 | Lefkowitz | 55/213 |

Primary Examiner—Charles Hart
Attorney, Agent, or Firm—Kenyon & Kenyon

[57] ABSTRACT

A device for controlling engine exhaust emission for use on an internal-combustion installation, in which a soot filter is arranged in an exhaust-gas system. The soot filter is made up of a flexible filter band that is traversed by the flow of exhaust gas in a first zone and which can be moved forward and renewed, continuously or intermittently, by a drive mechanism. The filter band is supported at least in the first zone by a flexible, moveable, endless conveyer belt that is permeable to gas and that absorbs tensile stresses. The filter band and the particles separated out of the exhaust gas by the filter band are burned together in a second zone.

13 Claims, 3 Drawing Sheets

DEVICE FOR CONTROLLING EXHAUST EMISSION

BACKGROUND OF THE INVENTION

The invention relates generally to a device for controlling the exhaust emissions produced by an internal-combustion engine and, more particularly, to a device of the type comprising a soot filter arranged in an exhaust-gas system. In such a device, the soot filter is made of a flexible filter band which is traversed by the flow of the exhaust gas in a first zone and which can be advanced forward. The filter band may be advanced, either continuously or intermittently, by means of a drive mechanism.

A related device for controlling exhaust emission is disclosed in the German Published Patent Application 38 37 669. It describes a soot filter installation for diesel engine exhaust gases having a filter band made of organic or inorganic material in the form of bonded fiber-fabric bands. These bands are designed to filter soot and other contaminant particles out of the traversing exhaust gas. In this device, the filter band is wound, loaded with contaminants, onto a spool and is fed to an external waste disposal unit. However, it is very costly and complicated, not to mention not very economical, to dispose of contaminant particles and the filter band externally. The exhaust gases, which form when the filter band and the particles are disposed of externally, must be filtered once more, thus requiring additional expenditure of time and energy. Moreover, the working properties of this soot filter installation for diesel engines are not very satisfactory, since high temperatures and pressures act directly on the filter band. The operational costs entailed in developing a functional filter material are extremely high and, due to the arrangement, introduce troublesome inaccuracies in controlling the band. Thus, one of the of a more economical exhaust emission device of the general type discussed above that is both economical and efficacious, and which does not rely on such multiple steps for the elimination of pollutants.

There remains a need for a device lacking the aforementioned deficiencies that is cost-effective, and that takes up a minimal amount of space. In such a system, both the filter band and the particles should be disposed of in the filtering system itself; the system should also have good working properties during normal operational use.

SUMMARY OF THE INVENTION

The invention solves this problem by utilizing a soot filter made of a flexible filter band. This band is fed from a dispenser to a point where it is joined to an endless conveyer belt. The band and belt pass through a first zone where the exhaust is passed through the filter band through holes in the underlying conveyer belt leading to the exterior of the system. The filter band, now laden with particles of soot, is then passed on to a second zone where it undergoes combustion.

Where the present device is used for controlling exhaust emissions on an internal-combustion engine installation, the filter band is supported at least in a first zone by a flexible, endless conveyer belt that is pervious to gas and which absorbs tensile stress. This conveyer belt is used to propel the overlying filter band forward. The filter band, which acts to separate out particulate matter from exhaust gas, is burned along with the particles of pollutants in a second zone. It is advantageous that both the filter band itself, as well as the filter cake of filtered particles situated on the band that results from the filtering action are disposed of within the filtering device. This simplifies the use of the device. An endless conveyer belt, such as a thin, flexible sheet metal provided with pores, is utilized to convey the filter band. Because the filter band is supported at least in the first zone by the endless conveyer belt, the filter band itself does not have to be especially strong, so that the operational costs of the system are substantially reduced compared to the system known from prior art. In selecting the material constitution of the filter band, one only has to be concerned that it possess good filtering properties.

According to a further refinement, the endless conveyer belt can be perforated over its entire length in an area along its lateral borders. These perforations are not covered by the filter band during normal operational use and may be brought into engagement with correspondingly shaped teeth located on the drive mechanism. The design of the drive mechanism may resemble that of the spool mechanism that is commonly used to wind film in a camera, which provides particularly precise control over the advancement of the band. Such structure is wholly conventional, and need not be explained further.

Another advantageous refinement provides for the drive mechanism to be electrically actuated and connected via an electronic control unit. This makes it particularly simple to control the drive cylinder as well as all of the subsequent functions within the soot filter in a timed, chronological sequence.

Other devices may also be actuated through the control unit, including the ignition device within the second zone, as well as an electrically driven fresh-air blower, and a device for conveying the particle-laden filter band into the second zone. The electronic control may be integrated with the internal combustion engine's electronic control structure. Such an arrangement provides considerable advantages in facilitating control of the process sequence.

Furthermore, the control unit can be connected to at least one sensor that provides information concerning an input variable. In the present invention, the input variables are the pressures on either side of the filter band. Two pressure transducers are employed: one of the pressure transducers is arranged on one side of the filter band in the area of unfiltered exhaust gas flow; the other of the pressure transducers is arranged on the other side of the filter band in the filtered exhaust gas flow. The endless conveyer belt and the filter band arranged on the belt may be driven in dependence upon the pressure differential across the filter band.

In order to filter contaminant particles out of the escaping exhaust gas as efficiently as possible, the filter band can be folded or doubled back at least once in the flow area of the escaping exhaust gas to enlarge the effective surface area of the filter. The filtering power of the device can be enhanced quite advantageously by such foldings. The filter, which may be constructed of carbon-black, may be repeatedly folded so long as not to be of an inappropriate length.

The design of the second zone of the soot filter provides for the particle-laden filter band to be guided over a grating of metallic or ceramic material. An ash box separable from the soot filter is mounted in the direction of the air flow provided by a blower behind the grating.

The filter band is selectively moved forward in this zone by a conveyer device comprising a transport cylinder having at least two conveyer arms that are uniformly distributed on its periphery; the transport cylinder is run so as to have essentially the same rotational speed during normal operational use as the drive mechanism for the conveyer belt. Within the scope of the present invention, the filter band is conveyed intermittently from the first zone into the second zone of the soot filter. The pressure differential between the front and rear side of the filter assures that the formed filter fabric will remain pressed firmly against the endless conveyer belt and that the unpurified exhaust gas will not form currents that leak past the filter. In the second zone, the formed filter fabric and the contaminant particles located on it are moved by the rotation of the transport cylinder. To rule out any spread over of combustion into the first zone, at least two conveyer arms are allocated to the transport cylinder on the periphery. They separate the second zone from the area of the unfiltered exhaust gas. A further refinement provides for the transport cylinder that conveys the filter band into the second zone to have a slightly higher rotational speed than the drive mechanism of the endless conveyer belt. As a result of this slight speed differential, the particle-charged filter band is conveyed into the second zone, without forming any unwanted kinks or extraneous folds. Coupling the two drive mechanisms makes it particularly simple to control the soot filter according to the invention.

DETAILED DESCRIPTION

Figure 1:
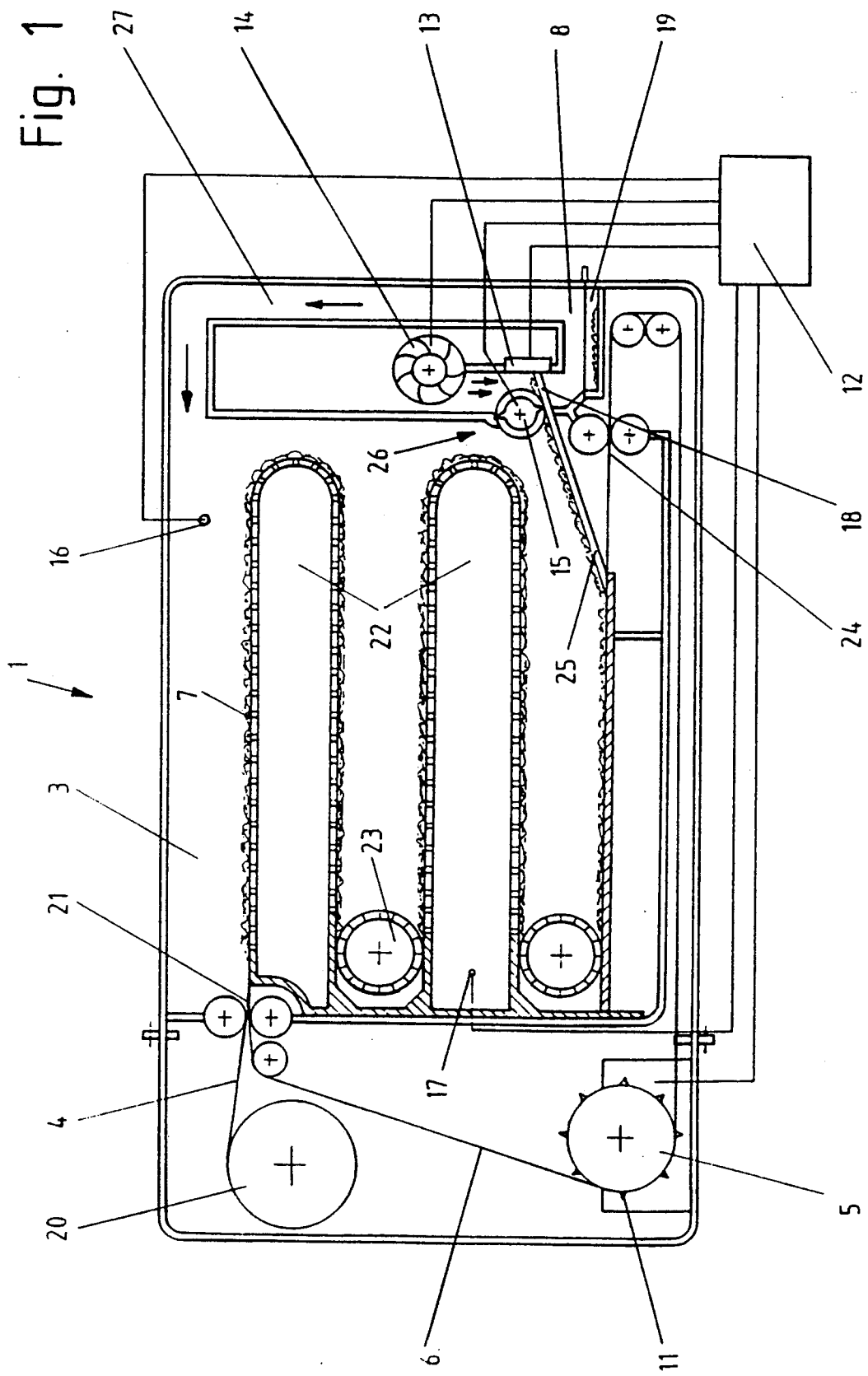
FIG. 1 is a schematic representation of the emission control system constructed according to the principles of the invention.

FIG. 1 schematically depicts a section through soot filter 1 that illustrates the invention. A flexible filter band 4 is uncoiled from a spool-like roller 20 and then joined with an endless conveyer belt 6. Joined, the filter and conveyer belt pass through an air lock 21 into a first zone 3, which is traversed by the flow of unpurified exhaust gas.

The endless conveyer belt 6, which may be made of a thin, flexible sheet metal that has been provided with pores, serves both to absorb the pressure differential between the front and rear sides of the filter band 4, as well as to absorb the tensile forces that may arise when the filter band 4 is conveyed through the first zone 3 into a second zone 8 of the soot filter 1.

The air lock 21 can consist of two rollers, between which the filter band 4 and the endless conveyer belt 6 are introduced, possibly with a slight tensioning of the rollers against each other, into the sealed first zone 3 provided for the unfiltered exhaust gas. The combined filter band and conveyer belt are moved over one or more disk-shaped chambers 22, which are provided with a number of orifices through which the exhaust gas (now filtered by the filter band) enters. From there, the filtered exhaust gas is directed into the remainder of the exhaust gas system and escapes into the atmosphere, free of sooty particles 7. At the front ends of the disk-shaped chambers 22, the filter band 4 is doubled back 180° and, after continuing over a rotating roll 23, is likewise doubled back again 180°. Rerouting the filter bands over the rolls 23 results in an enlarged filtering surface for a soot filter 1 in a small space. Depending on the particular application, the filter band 4 may be doubled back only once. In this manner, a very flat type of construction is achieved, which can be advantageous, for example, for certain specialized motor vehicle floors.

After being doubled back several times in the area of the first zone 3, the filter band 4, along with its associated filtered particles 7, is separated from the endless conveyer belt 6 immediately before entering the second zone 8. The endless conveyer belt 6 is guided through an outgoing air lock 24 and fed via several guide rollers back to the drive mechanism 5. The filter band 4, which carries the particles 7 and which has at this point been peeled off from the endless conveyer belt 6, is transported over a ramp 25 to a disposal lock 26. Behind this disposal lock, the filter band 4 and the particles 7 are ignited by a firing device 13. The resulting combustion is carried out in the presence of a plentiful supply of fresh air supplied by a fresh-air blower 14, which provides for both clean combustion and low exhaust gas temperature. The exhaust gas formed during this combustion is admixed with the unfiltered exhaust gas flow by way of an exhaust duct 27, which in this embodiment rises perpendicularly. The dimensions of the system are compact, in part, because the filter band 4 and the separated particles 7 are disposed of together.

Control over the system resides in an electronic control unit 12. Pressure is measured by a first pressure sensor 16 located in front of the filter and by a second pressure sensor 17 located behind the filter band 4. At the start of the operation cycle of the filter, few particles of soot will be adhered to the filter, and the measured pressure differential across the filter band 4 will be minimal. As the particles build up as a cake along the band, it becomes more difficult for air to traverse the band 4, which causes a pressure differential to form across it. The integrity of the pressure differential between both sides of the filter band 4 is enhanced because the filter band 4 is pressed firmly against the endless conveyer belt 6 and because the unpurified exhaust gas cannot form currents that leak past the filter.

When this differential has reached a significant level, it is desirable to feed fresh filter material to the first zone 3 and burn a corresponding length of particle-laden filter band 4. The drive mechanism 5 for the endless conveyer belt 6 on which the band 4 is mounted can thus be started by comparing the information provided by the two pressure sensors. The ignition 13, as well as the fresh-air blower 14, are also actuated by the control unit 12.

Figure 2:
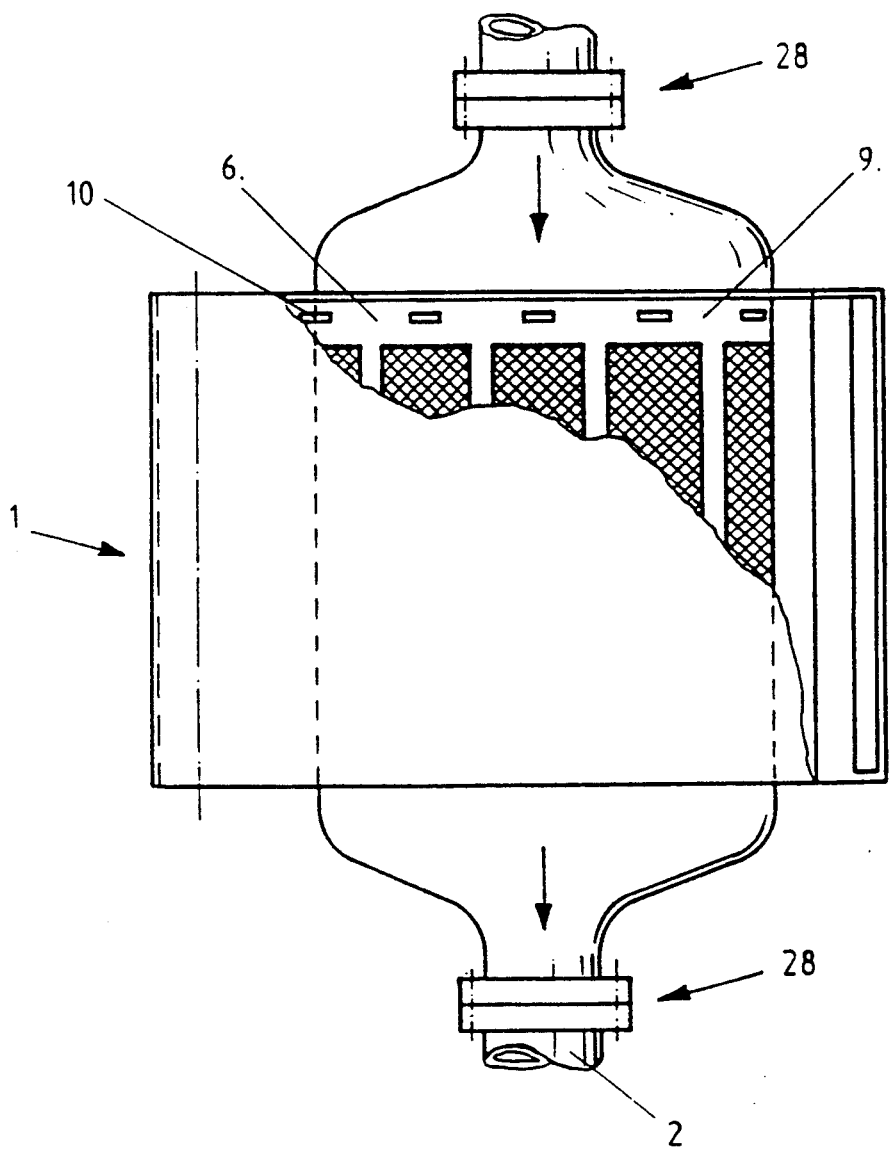
FIG. 2 is a partial cut-away of the device of FIG. 1 installed as a component of an exhaust system.

FIG. 2 shows a partially cut-away top view of a filter. It illustrates that the soot filter may be situated directly in front of the exhaust end of an engine (at this point, the exhaust may have a low temperature) where it can be easily connected and exchanged, with only two connections 28 and an electrical plug in connection being required.

Figure 3:
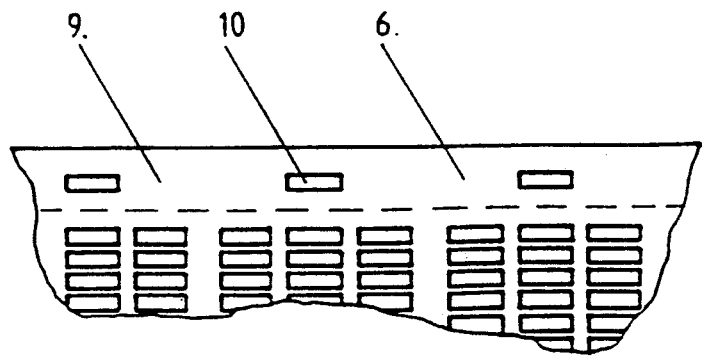
FIG. 3 shows an enlarged cut-away portion of the conveyer belt depicted in FIG. 2.

FIG. 2 also shows the endless conveyer belt 6, which in the area of its lateral boundary edges 9 has a series of perforations 10 which mesh with the corresponding teeth 11 of the conveying mechanism 5 shown in FIG. 1. FIG. 3 shows an enlarged representation of the endless conveyer belt 6. The outer edge of the filter band 4 arranged on the conveyer belt 6 is shown in phantom with dotted lines. Referring to FIG. 3, the perforations 10 in the area of the lateral boundary edges 9 of the conveyer belt 6 are not covered by the filter band 4 during normal operational use. During the disposal combustion operation in the second zone 8, the filter band 4 is preferably always moved forward by fixed segments, so that during the disposal operation, constant lengths of the particle-laden filter fabric can always be disposed of. This also enhances the reliability of the sealing action in the area of the air lock 21 and the outgoing lock 24.

Figure 4:
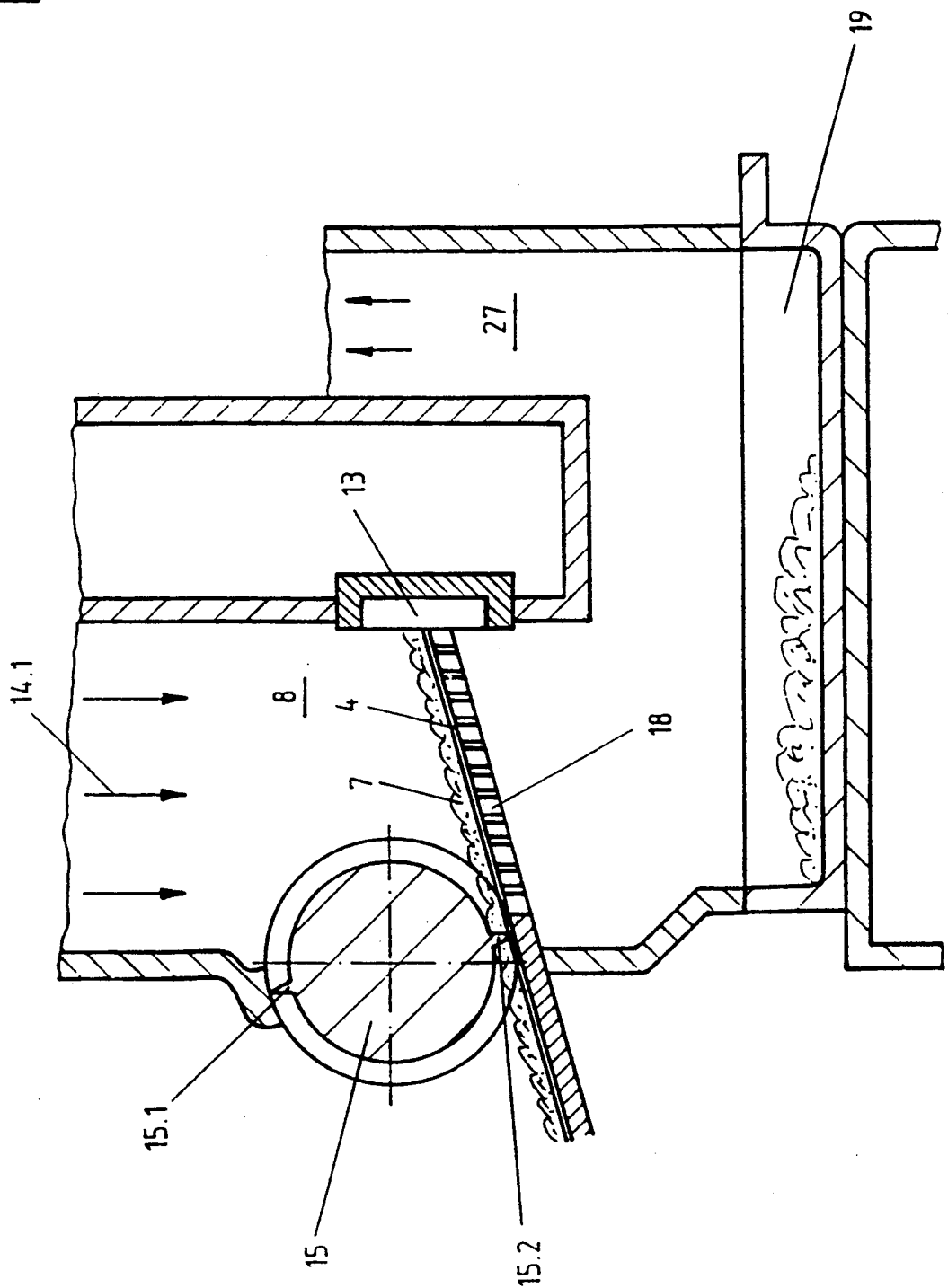
FIG. 4 shows an enlarged portion of the second zone of the soot filter of FIG. 1.

FIG. 4 shows an enlarged representation of the second zone 8 of the soot filter 1. The filter band 4, together with the particles 7 arranged on it, are transported into the second zone 8 by rotating a conveyer device 15 by 180°. This is accomplished with the aid of the control unit (not shown in this depiction) and a drive mechanism (not shown in greater detail here), which can be coupled to the drive mechanism of the endless conveyer belt 6. To rule out the spread of combustion into the first zone 3, the conveyer device 15 is provided on the periphery with a blade-shaped device, which guarantees a reliable spatial separation between the first zone 3 and the second zone 8. The filter band 4 with the particle-filter cake that arrives in the second zone 8 is pushed across a grating 18 and ignited on its front end by the firing device 13. This firing device 13 can work in a fashion similar to a cigarette lighter found in motor vehicles. Alternatively, other firing devices can also be used, such as flame-spark systems. A comparatively large air current 14.1 from the fresh-air blower 14 is directed to the ignited bonded fiber fabric as well as the particle-filter cake, so that the result is clean combustion in the presence of considerable excess air, and a low average exhaust temperature in the range of less than 300° C.

The exhaust gas that forms during this operation is admixed via a rising exhaust duct 27 with the non-burned exhaust flow, that still must be purified in the first zone. The ash constituents formed during the combustion of the filter band 4 are collected in an ash box 19 arranged in the lower part of the soot filter 1. Waste is removed from this ash box at temporal intervals, for example, in connection with the introduction of a roller 20 loaded with a fresh supply of formed filter fabric.

What is claimed is:

1. A filter device for controlling the exhaust emissions produced by an engine, the filter device comprising:
   a supply of flexible filter band for filtering out particles of soot and other emissions from the engine exhaust, said flexible filter band being located along at least part of its length in a first zone where it is traversed by the flow of exhaust gas;
   a flexible, endless conveyor belt that is pervious to gas and to which the flexible filter band is attached along part of the length of the flexible filter band and part of the length of the conveyer belt, wherein the conveyer belt further serves to absorb tensile loads from the flexible filter band;
   a drive mechanism for advancing the conveyer belt forward either continuously or intermittently, so that with each advance of the conveyer belt, a fresh length of the flexible filter band is advanced from its supply to transport with the conveyer belt; and
   a second zone defining a combustion chamber in which the band and particles may be burned together.

2. The device according to claim 1, in which:
   the drive mechanism includes teeth;
   the conveyer belt has rows of perforations along its lateral boundary portions, the filter band is of a width such that it does not cover said perforations during normal operational use, wherein said perforations are sized so that they may be brought into engagement with the correspondingly shaped teeth of the drive mechanism.

3. The device according to claim 1, wherein the drive mechanism is electrically actuated and is connected to an electronic control unit.

4. The device according to claim 3, wherein the control unit is connected to a firing device within the second zone, to an electrically actuated fresh-air blower, and to a conveyer device provided for the filter band in the second zone.

5. The device according to claim 5, wherein the control unit is connected to at least one sensor which describes an input variable.

6. The device according to claim 5, further comprising:
   a first pressure sensor located on the side of the filter band of unfiltered exhaust gas flow;
   a second pressure sensor located on the other side of the filter band in the filtered exhaust gas flow; and
   the control device is responsive to the difference in pressures sensed by the two sensors.

7. The device according to claim 1, wherein the filter band is deflected at least once in the flow area of the escaping exhaust gas to enlarge the effective surface area of the filter.

8. The device according to claim 1, further comprising:
   a fresh air blower for supplying fresh air for combustion;
   a transport cylinder for moving the filter band into the second zone, said transport cylinder having at least two conveyer arms that are uniformly distributed on its periphery, wherein the transport cylinder has essentially the same rotational speed during normal operational use as the drive mechanism provided for the endless conveyer belt;
   a metallic or ceramic grating in the second zone over which the filter band is guided within the second zone; and
   a separable ash box mounted in the direction of the blower's air flow behind said grating.

9. The device according to claim 2, further comprising:
   a fresh air blower for supplying fresh air for combustion;
   a transport cylinder for moving the filter band into the second zone, said transport cylinder having at least two conveyer arms that are uniformly distributed on its periphery, wherein the transport cylinder has essentially the same rotational speed during normal operational use as the drive mechanism provided for the endless conveyer belt;
   a metallic or ceramic grating in the second zone over which the filter band is guided within the second zone; and
   a separable ash box mounted in the direction, of the blower's air flow behind said grating.

10. The device according to claim 2, wherein the filter band is deflected at least once in the flow area of the escaping exhaust gas to enlarge the effective surface area of the filter.

11. A process for purifying exhaust gas by using a filter band, comprising the steps of:

supplying a flexible filter band for filtering out particles of soot and other emissions from the engine exhaust;

placing the filter band in cooperation with an underlying conveyer belt that is pervious to gas;

advancing the conveyer belt and filter band forward through an air lock to a first zone which contains unpurified exhaust gas, and in which the filter band and the conveyer belt are placed against each other because of the different pressures prevailing on both sides of the filter band and the conveyer belt;

lifting the filter band off the conveyer belt and guiding it into a second zone in which the filter band and the particles are burned as the result of firing under a fresh air supply, so that the solid residues from combustion pass through a grating to an ash box, and the exhaust gases from the combustion are recirculated into the first zone.

12. The method of claim 9, wherein the conveyer belt and filter band are looped back over at least one guide roller in order to enlarge the effective surface area of the filter.

13. The method of claim 1, wherein the filter band is advanced in dependance on the pressure differential across its surfaces.

* * * * *

UNITED STATES PATENT AND TRADEMARK OFFICE
CERTIFICATE OF CORRECTION

PATENT NO. : 5,232,477

DATED : August 3, 1993

INVENTOR(S) : Kurr et al.

It is certified that error appears in the above-indentified patent and that said Letters Patent is hereby corrected as shown below:

Column 1      line 38, after "the" second occurrence insert --problems to which this invention is directed is the provision--.

Signed and Sealed this

Twenty-fourth Day of May, 1994

Attest:

BRUCE LEHMAN

Attesting Officer      Commissioner of Patents and Trademarks